(12) United States Patent
Fujita

(10) Patent No.: US 7,734,456 B2
(45) Date of Patent: Jun. 8, 2010

(54) METHOD AND APPARATUS FOR PRIORITY BASED DATA PROCESSING

(76) Inventor: Osamu Fujita, 3-15-1-5-407, Suzaku, Nara-city, Nara, 6310806 (JP)

( * ) Notice: Subject to any disclaimer, the term of this patent is extended or adjusted under 35 U.S.C. 154(b) by 0 days.

(21) Appl. No.: 10/594,590

(22) PCT Filed: Mar. 14, 2005

(86) PCT No.: PCT/JP2005/004452

§ 371 (c)(1),
(2), (4) Date: Jul. 2, 2007

(87) PCT Pub. No.: WO2005/098612

PCT Pub. Date: Oct. 20, 2005

(65) Prior Publication Data

US 2008/0052496 A1 Feb. 28, 2008

(30) Foreign Application Priority Data

Mar. 30, 2004 (JP) .............................. 2004-132206

(51) Int. Cl.
G06F 17/50 (2006.01)
G06F 19/00 (2006.01)
(52) U.S. Cl. ..................... 703/13; 718/100; 718/103
(58) Field of Classification Search ............. 703/6, 703/13, 17; 700/7, 11; 718/100, 103
See application file for complete search history.

(56) References Cited

U.S. PATENT DOCUMENTS 5,247,677 A * 9/1993 Welland et al. ............. 718/103
5,274,809 A * 12/1993 Iwasaki et al. ............. 718/104
2005/0188373 A1* 8/2005 Inoue et al. ................. 718/100

FOREIGN PATENT DOCUMENTS

| JP | 10-091450 A | 4/1998 |
|---|---|---|
| JP | 11-3321 A | 1/1999 |
| JP | 11-259444 A | 9/1999 |
| JP | 11-305993 A | 11/1999 |
| JP | 2000-163392 A | 6/2000 |

* cited by examiner

Primary Examiner—Kamini S Shah
Assistant Examiner—Herng-Der Day
(74) Attorney, Agent, or Firm—Birch, Stewart, Kolasch & Birch, LLP

(57) ABSTRACT

An important component selection device is provided for selecting a component having a higher importance in a simulation calculation, so that the component having a higher priority is calculated firstly by a calculation device and the importance of the updated component is re-evaluated so as to be reflected in the calculation thereafter. When a high speed is required, the ranking of the important components are realized by hardware. Moreover, when a storage device has a plurality of candidate value data for each of the component data and the calculation device updates the candidate values one by one, the magnitude of variety of the candidate values is used as the importance of the component data and the component having this value which is large is calculated with a higher priority so that the calculation of the component having a small change is omitted, thereby increasing the simulation speed.

7 Claims, 19 Drawing Sheets

FIG. 14

| CONTROL SIGNAL | CONDITIONS | | | COMPARATOR OUTPUT | | | | | SELECTOR/ ARITHMETIC UNIT OUTPUT |
|---|---|---|---|---|---|---|---|---|---|
| | IMPORTANCE | SAME COMPONENT POSITION | G(k−1) | G(k) | G(k+1) | S(k) | LS(k) | | |
| PUSH | $P(k) \geqq P_{in}$ | * | * | 0 | * | * | * | R(k) |
| | $P(k-1) \geqq P_{in} > P(k)$ | $k \leqq K_s$ | 0 | 1 | * | * | 0 | Din |
| | $P_{in} > P(k-1) \geqq P(k)$ | $k \leqq K_s$ | 1 | 1 | * | * | 0 | R(k−1) |
| | * | $k > K_s$ | * | * | * | * | 1 | R(k) |
| POP | $P(k) \geqq P(k+1) \geqq P_{in}$ | * | * | 0 | 0 | * | * | R(k+1) |
| | $P(k) \geqq P_{in} > P(k+1)$ | $k < K_s$ | * | 0 | 1 | 0 | 0 | Din |
| | $P_{in} > P(k)$ | $k < K_s$ | * | 1 | * | 1 | 0 | R(k) |
| | * | $k = K_s$ | * | * | * | * | 1 | R(k+1) |
| | * | $k > K_s$ | * | * | * | * | * | R(k+1) |
| ADD | * | * | * | * | * | * | * | P(k) + a |
| SFTL | * | * | * | * | * | * | * | P(k) << a |
| SFTR | * | * | * | * | * | * | * | P(k) >> a |

FIG. 15

PUSH

| k | G | MAGNITUDE COMPARISON | IMPORTANCE DATA | COMPONENT IDENTIFIER | MATCH COMPARISON | S | LS |
|---|---|---|---|---|---|---|---|
| 1 | 0 | Pin ≦ | 98 | 777 | ≠ | 0 | 0 |
| 2 | 0 | Pin ≦ | 74 | 200 | ≠ | 0 | 0 |
| 3 | 0 | Pin ≦ | 60 | 101 | ≠ | 0 | 0 |
| 4 | 1 | Pin > | 33 | 020 | ≠ | 0 | 0 |
| 5 | 1 | Pin > | 27 | 700 | ≠ | 0 | 0 |
| 6 | 1 | Pin > | 15 | 555 | = | 1 | 0 |
| 7 | 1 | Pin > | 8 | 300 | ≠ | 0 | 1 |
| 8 | 1 | Pin > | 5 | 808 | ≠ | 0 | 1 |

Ks →

| 60 | 555 |
|---|---|

INPUT DATA

FIG. 16

| k | G | MAGNITUDE COMPARISON | IMPORTANCE DATA | COMPONENT IDENTIFIER | MATCH COMPARISON | S | LS |
|---|---|---|---|---|---|---|---|
| 1 | 0 | Pin ≦ | 98 | 777 | ≠ | 0 | 0 |
| 2 | 0 | Pin ≦ | 74 | 200 | ≠ | 0 | 0 |
| 3 | 0 | Pin ≦ | 60 | 101 | ≠ | 0 | 0 |
| 4 | 1 | Pin > | 33 | 020 | ≠ | 0 | 0 |
| 5 | 1 | Pin > | 27 | 700 | ≠ | 0 | 0 |
| 6 | 1 | Pin > | 15 | 555 | = | 1 | 0 |
| 7 | 1 | Pin > | 8 | 300 | ≠ | 0 | 1 |
| 8 | 1 | Pin > | 5 | 808 | ≠ | 0 | 1 |

POP

INPUT DATA: 60 | 555

| k | G | MAGNITUDE COMPARISON | IMPORTANCE DATA | COMPONENT IDENTIFIER | MATCH COMPARISON | S | LS |
|---|---|---|---|---|---|---|---|
| 1 | 0 | Pin ≦ | 98 | 777 | ≠ | 0 | 0 |
| 2 | 0 | Pin ≦ | 74 | 200 | ≠ | 0 | 0 |
| 3 | 0 | Pin ≦ | 60 | 101 | ≠ | 0 | 0 |
| 4 | 0 | Pin ≦ | 33 | 020 | ≠ | 0 | 0 |
| 5 | 0 | Pin ≦ | 27 | 700 | ≠ | 0 | 0 |
| 6 | 0 | Pin ≦ | 15 | 555 | = | 1 | 0 |
| 7 | 0 | Pin ≦ | 8 | 300 | ≠ | 0 | 1 |
| 8 | 1 | Pin > | 5 | 808 | ≠ | 0 | 1 |
|   |   |   | 0 | 0 |   |   |   |

POP

INPUT DATA: 7 | 555

Ks →

$C1=\{1, 2\}, C2=\{\}, C3 = \{3\}, C4 = \{4,5\}, C5 = \{6\}$ $i \in C(j)$ for $b(j) \leqq Yi < b(j+1)$

METHOD AND APPARATUS FOR PRIORITY BASED DATA PROCESSING

TECHNICAL FIELD

The present invention relates to an apparatus for performing high-speed digital computer simulation efficiently and at low cost, particularly, high speed simulation that is targeted to a physical model, signal propagation on a network, prediction of a three-dimensional polymer structure, and the like, in which mainly local interaction is important.

BACKGROUND ART

Conventionally, in simulation of a system composed of multiple components, such as a model of a physical or social phenomenon, in order to calculate time variation of the system, energy minimization, relaxation to self-consistency, or the like, state values for all components and a conditional expression or state transition expression relating to the components are calculated one by one in turn, repeatedly over and over again, and the state values are updated little by little, whereby the precise numerical values are determined. Therefore, it requires an amount of calculation time proportional to the power of the number of all components and thus if the number of the components is enormous, calculation time takes too much time; accordingly, there is a problem in that it becomes difficult to obtain results.

Particularly, in the case of simulation of time variation of a physical system, just determining all state values at a given time step requires energy minimization and relaxation to self-consistency and thus there is a need to perform iterative calculation for correcting each state value. Since such calculation is repeatedly performed for each time step, enormous calculation time is required. In the case of a system in which all components change greatly or a system for obtaining very precise calculation results, such an amount of calculation time may be absolutely needed. A drawback is that, even in other cases, in conventional calculation methods, it always requires about an equal amount of calculation time.

As a solution of a search or optimization problem by a computing machine, there is a method, such as branch and bound, in which a component list representing the priority order of calculation is provided and calculation is performed according to the list without calculating all components in turn. This method, however, aims at correct computation and a calculation process of component data and an update to the priority order list are processed one by one as a software algorithm and hence, the method has a drawback in that, an update to the list takes time, which in turn increases overall processing time. In addition, when such a software scheme is applied to the case in which data processing for each component is relatively simple, such as the aforementioned computer simulation of physical systems, there is a drawback in that the proportion of costs for calculation of priority order to the cost for data processing for each component is higher and thus calculation efficiency does not improve much. As a scheme of parallel computation, there is an invention in which a scheduler schedules multiple processes into multiple processors, such as a parallel computing system of patent document 1, for example. However, the invention is for load distribution and thus cannot be applied to a process of minutely dividing calculation of each component in simulation calculation. Although an apparatus that arranges data by hardware at high speeds is already invented, such as a sorting apparatus of patent document 2, the apparatus does not have a mechanism for rearranging the data by importance and thus cannot be used in terms of an object of the present invention.

Patent Document 1: Japanese Patent Application Laid-Open No. 11-3321

Patent Document 2—Japanese Patent Application Laid-Open No. 11-305993

DISCLOSURE OF THE INVENTION

Problems to be Solved by the Invention

For example, in the actual physical phenomenon or social phenomenon, there may be a case in which only a part of components changes at a given time and there is almost no change in other majority of the components. In addition, there are cases where noise inside and outside a system is basically large, or where external conditions are various and different and thus they should be handled statistically and stochastically, and in such cases it may be nonsense to perform precise calculation more than necessary on numerical value data that originally has low accuracy. In such a case, a conventional-art calculation process includes a lot of repetitions of such wasted calculation that does not have much influence on final results. The present invention is made to omit such wasted calculation and perform simulation calculation efficiently and at low cost.

Means to Solve the Problems

In the present invention, a component having high importance of calculation is selected, calculation is performed on the component having high importance on a priority basis, the importance of the component which has been subjected to the calculation is re-evaluated, and a result of the re-evaluation is reflected on subsequent selection of an important component. Calculation for components having low importance may be performed later or may be ignored by a certain criterion, whereby estimation results are obtained efficiently and as soon as possible and thereafter, if necessary, time is spent on improving calculation accuracy.

Therefore, in addition to calculation of a value of each component, a process of calculating importance of each component is provided, an important component selection apparatus is provided as a dedicated apparatus for performing such a process, and the apparatus ranks the components according to their importance. In calculation of a state value of each component, a calculation process is performed on the most important component indicated by the important component selection apparatus on a priority basis. For a calculation model that allows calculation of a state value of each component to be performed independently, a plurality of data processing apparatuses capable of accessing a single shared memory are provided and data processing is performed parallelly and simultaneously, realizing a further increase in speed. The data processing apparatus and the important component selection apparatus may also operate parallelly and simultaneously. Immediately after the data processing apparatus ends a process for a single component, the data processing apparatus reads a next important component and performs a process for that component. In the important component selection apparatus also, its internal process can be run independently. Depending on application cases, to prevent only one component from being continuously selected as the most important component and thereby a calculation process for that component is repeated, in an update to importance, a certain time delay is set or an adjustment can be made variably.

For a calculation model that requires a process at a highest speed in the important component selection apparatus, calculation for ranking important components is implemented by hardware. Specifically, a plurality of registers are used for holding importance data that represent the importance of components and component identifiers that indicate which component each importance data represents, and for arranging them in descending order of positions. In the registers, adjacent registers can shift data therebetween. In addition, comparators attached to the respective registers, are placed. The comparators simultaneously compare data in the respective registers with input data and insert, according to results of the comparison, the input data in a location that satisfies its importance position. Note that if the same component identifier as that of the input data is already stored, the input data is inserted only when the importance of the input data is higher than that of the one already stored, and data having lower importance is deleted. By setting an arranged state as an initial value, data to be inputted one by one subsequently is always arranged and held in order of importance. It never occurs that two or more data of the same component identifier are stored. By using this hardware, an insertion operation of input data and an output operation can be simultaneously processed in one machine cycle, and thus, an arrangement of data by importance can be performed at high speeds.

In the important component selection apparatus, although data having high importance is outputted one after another and processed and data having low importance is pushed out to a direction of the lowest level, data having medium importance may remain for a long period of time and thus may be hardly selected as an processing target. When there is a need to prevent such old data from remaining, an arithmetic unit capable of performing an arithmetic process on importance data in each register is provided. By using the arithmetic unit to periodically add a certain value to each data or perform a bit shift or multiplication on each data, importance data is rewritten to greater values maintaining the order relationship between the data, whereby an adjustment can be made such that the importance of old data is increased and data processing is performed. In contrast, by periodically rewriting importance data to smaller values, an adjustment can also be made such that old data can be deleted as soon as possible.

In order to omit wasted data processing for a component having little change, in a storage apparatus, a plurality of candidate value data are held for each of a plurality of component data. The data processing apparatus regards a statistic of a plurality of candidate values of a component as a representative value of the component data and performs a calculation process on each component data to calculate an updated value for each component data, and then replaces a candidate value that differs most greatly from an updated value with the updated value. As the statistic for this case, an average value, a median value, or the like is used. Then, the important component selection apparatus regards the magnitude of variation in candidate values for a component data as an importance of that component data and selects an important component based on an order of magnitude of variation in candidate values. The reason that variation in candidate values is regarded as importance is that by that it is possible to indicate conditions where values of component data are not sufficiently converged in simulation or conditions where time variation is large and to give priority to a calculation process for component data having a large change over that for component data having a little change. By this, a calculation process that does not have much influence on final results of calculation can be omitted, making it possible to obtain estimation results at faster speeds.

When there is a possibility that the importance of only some components may increase and thus a calculation process therefore may be biased, a function of making an adjustment such that other components have high importance is provided. For example, to a part of a program of data processing is added a method of adding a process of providing high importance to a component selected by random numbers and sending the component to the important component selection apparatus, a method in which a process of calculating all components is interposed every certain period of time, or the like, and an adjustment is made by software. Alternatively, a method in which, importance is set to a maximum value all at once in the important component selection apparatus, and all components stored there are subjected to data processing in turn, or the like is used.

EFFECT OF THE INVENTION

There are advantageous effects that in a physical phenomenon or social phenomenon that is a target for simulation, when high accuracy computation is not required, due to large noise or low initial value dependency or the like, calculation of high importance is given priority and wasted calculation is ignored or performed later, whereby estimation results can be obtained efficiently with little calculation resource, calculation time is reduced, and calculation cost is reduced.

BRIEF DESCRIPTION OF THE DRAWINGS

FIG. 14 is a relationship table between a control signal of the selector/arithmetic unit of the fourth embodiment and an output.

FIG. 15 is an illustrative diagram showing an exemplary operation of PUSH of the fourth embodiment.

FIG. 16 is an illustrative diagram showing an exemplary operation 1 of POP of the fourth embodiment.

FIG. 17 is an illustrative diagram showing an exemplary operation 2 of POP of the fourth embodiment.

Figure 1:
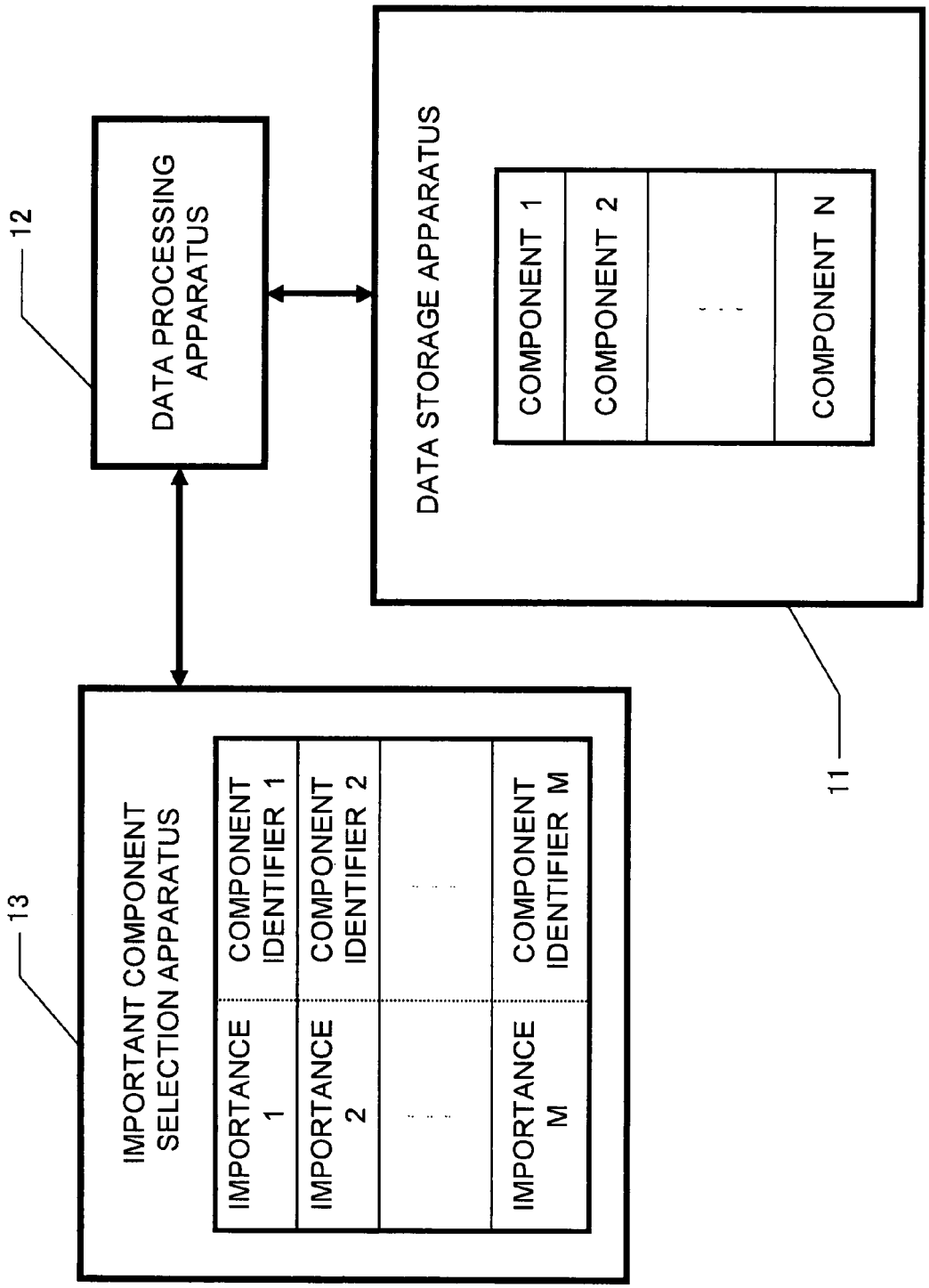
FIG. 1 is a basic block configuration diagram showing a first embodiment of the present invention.

DESCRIPTION OF THE REFERENCE NUMERALS 11, 12, 31, 41, 51, and 61: DATA STORAGE APPARATUS
12, 22, 32, 42, 52, and 62: DATA PROCESSING APPARATUS
13, 23, 33, 43, 53, and 63: IMPORTANT COMPONENT SELECTION APPARATUS
34: MEMORY INPUT/OUTPUT CONTROL CIRCUIT
35: DATA TRANSFER CONTROL CIRCUIT
36: FIFO BUFFER REGISTER
37: SUBSEQUENT WRITE CONTROL CIRCUIT
38: STORAGE ELEMENT
39: DATA SELECTOR
410: REGISTER
420: DATA ARRANGEMENT CONTROL CIRCUIT
421: COMPARATOR
422: SELECTOR/ARITHMETIC UNIT
423: MAGNITUDE COMPARATOR
424: MATCH COMPARATOR
425: DATA SELECTOR
426: ARITHMETIC UNIT
427: OUTPUT SELECTOR

BEST MODE FOR CARRYING OUT THE INVENTION

Embodiments of the present invention will be described below based on FIGS. 1 to 20.

Figure 2:
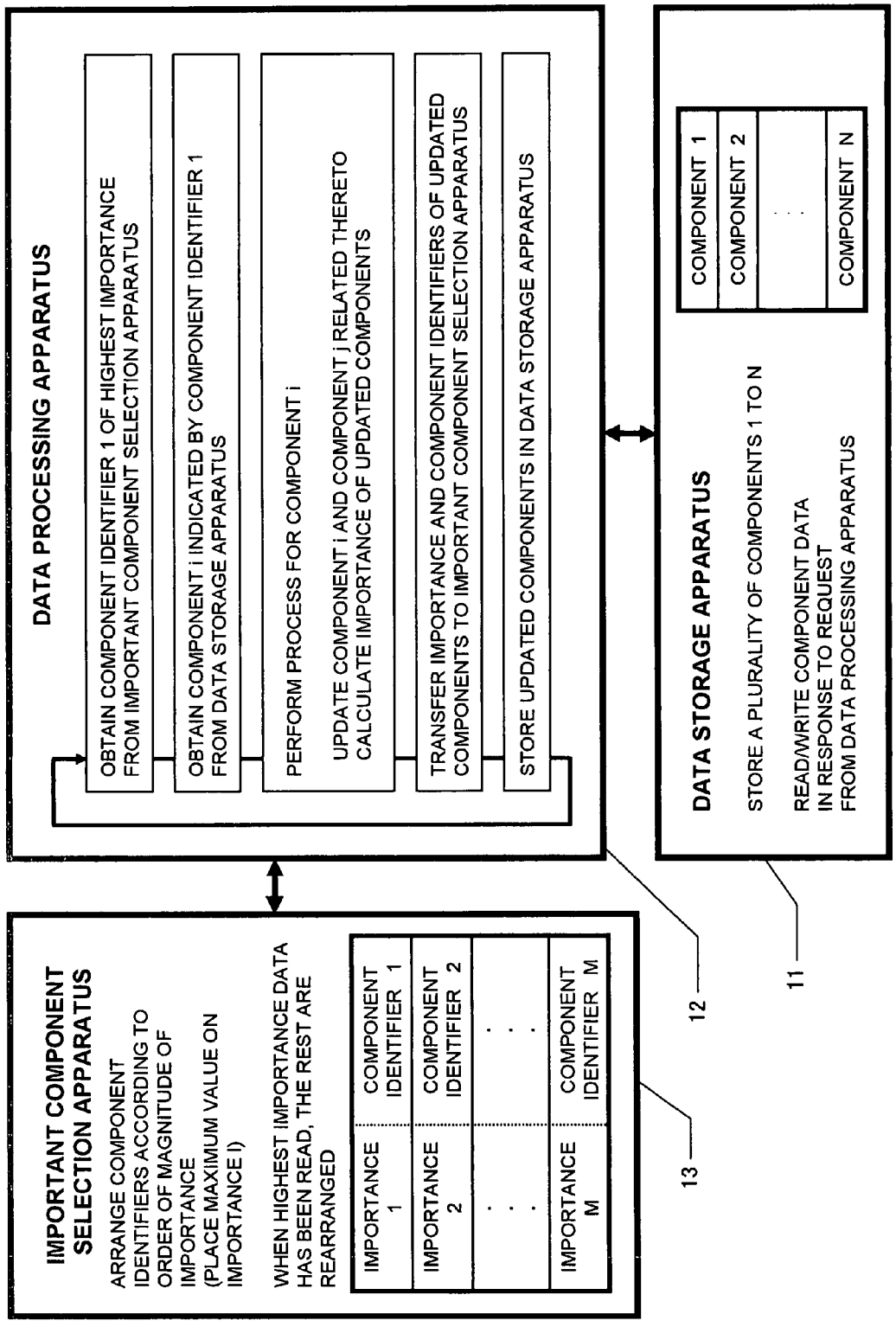
FIG. 2 is an illustrative diagram showing a summary of an operation in the first embodiment.

A basic block configuration diagram of a first embodiment of an apparatus of the present invention is shown in FIG. 1. A summary of an operation of each block is shown in FIG. 2. The apparatus is mainly comprised of a data storage apparatus 11, a data processing apparatus 12, and an important component selection apparatus 13. The data storage apparatus 11 stores N pieces of data labeled Component 1 through Component N. The data processing apparatus 12 performs data processing corresponding to each component. The data processing is implemented by a program. The important component selection apparatus 13 has a function of storing an importance of each component and a component identifier, and selecting a component having the highest importance among them. Each time an importance and a component identifier of a component are inputted to the important component selection apparatus 13, the importance and the component identifier are arranged in order of magnitude of importance. In the process for this case, since, at the time of inputting a component, components that are already inputted before the input have been arranged, a location that satisfies the magnitude relation of importance is searched and the component is inserted in the location. In the present embodiment, a component number is used as a component identifier.

To cause the apparatus to operate, first, an initial value is set to each component data and the data processing apparatus 12 performs an initialization routine. For the initialization routine, by a method of performing calculation for all components one by one in turn, a method of performing computation randomly for some of the components, or the like, values of components necessary for computation are read from the data storage apparatus 11 and an data process for each component is performed, whereby updated values of the components are determined. In addition, an importance of each component is calculated and the importance and component identifier (component number) of each component are inputted to the important component selection apparatus 13. Then, an updated value of each component is stored in the data storage apparatus 11.

Instead of the initialization routine, component identifiers and importance data provided for the respective components, may be assigned, as initial values, to M registers in the important component selection apparatus 13. By setting a maximum value to all the importance, the components set with the initial values are all given priority and are subjected in turn to data processing according to the order of arrangement of the component identifiers (component numbers).

A summary of main process after the initialization process is shown in FIG. 2. The data processing apparatus 12, first, reads a component identifier (component number) of the highest importance from the important component selection apparatus 13. Given that the component number is i, then, the data processing apparatus 12 reads a component i from the data storage apparatus 11 and performs data processing for the component i. For a specific data processing, an appropriate program can be made as software for the data processing apparatus 12 according to the application purpose. In this process, not only the component i but also any other one or more components, for example, a component j, can be updated. For a component to be updated, importance of that component is calculated. After this, the importance and component number(s) of a component(s) to be updated are sent out to the important component selection apparatus 13 and an updated value(s) of the component(s) is/are sent out to the data storage apparatus 11. When a series of these processes is completed, immediately, the most important component is read from the important component selection apparatus 13 and the same processes are repeated. The data processing apparatus 12 continuously performs this loop process until a termination condition which is set by the program is reached.

When a component identifier (component number) of the highest importance has been read by the data processing apparatus 12, the important component selection apparatus 13 deletes the data and moves other component identifiers up one position. Each time a set of input data on importance and a component number is inputted from the data processing apparatus 12, the important component selection apparatus 13 arranges the input data according to the order of importance. Let $P(k)$ be the value of importance of data in k-th position in the arrangement and let Pin be the value of importance of the input data. Since $P(k)$ is already arranged in such an order that $P(k) \geq P(k+1)$ for every k, the important component selection apparatus 13 searches for a k-th location where $P(k) \geq Pin > P(k+1)$, moves all data below the k-th position down one position, and places the input data in the (k+1)th position. Data in the lowest M-th position is discarded. However, if data having the same component identifier as the input data is present in stored data, importance is compared between the two and if the importance of the input data is lower, then the input data is not inserted. In contrast, if the importance of the input data is higher, the input data is inserted in the above described manner and the data previously stored is deleted. Due to this change, the positions of data having lower importance than the data previously stored do not change.

Figure 3:
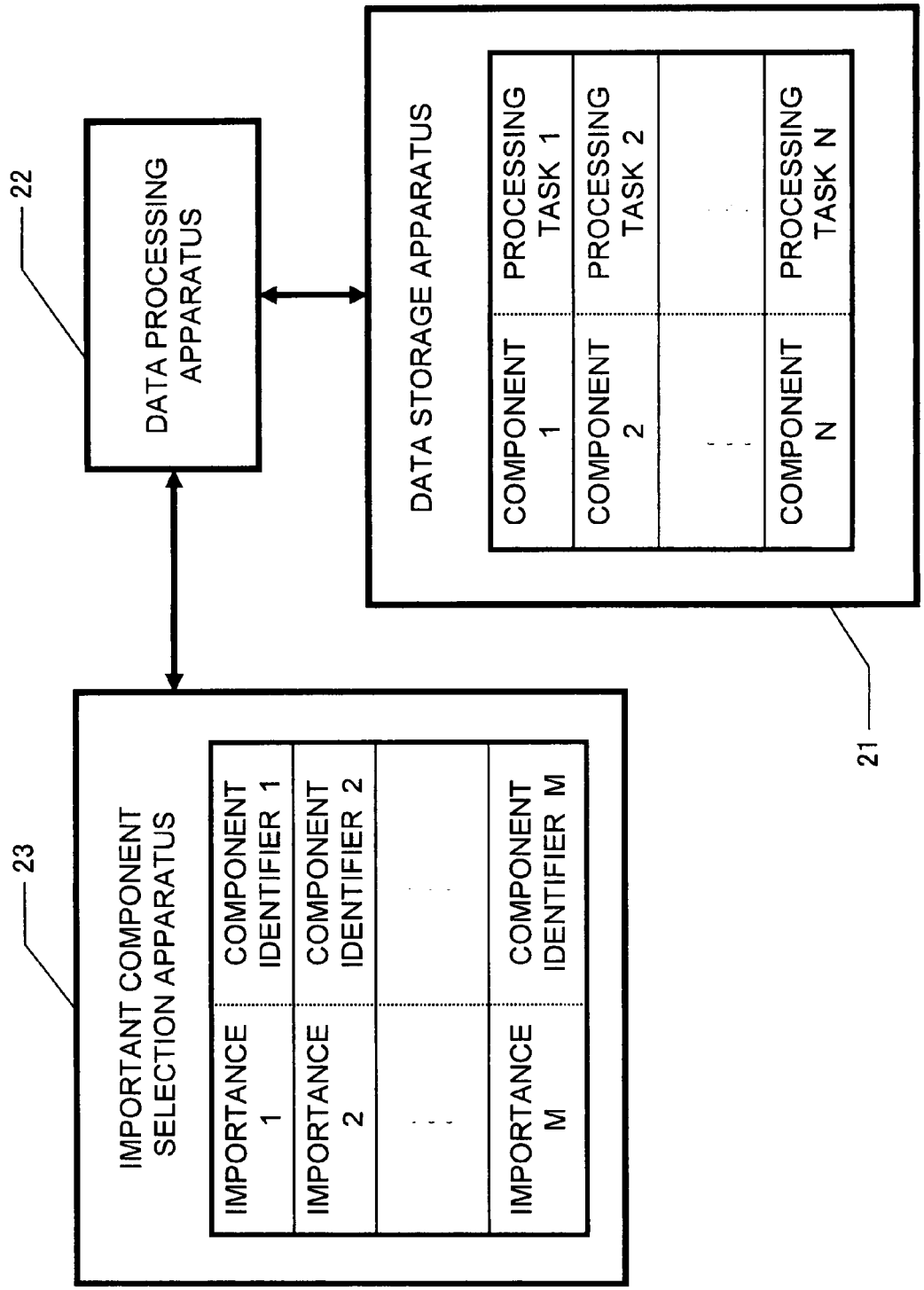
FIG. 3 is a basic block configuration diagram showing a second embodiment of the present invention.
Figure 4:
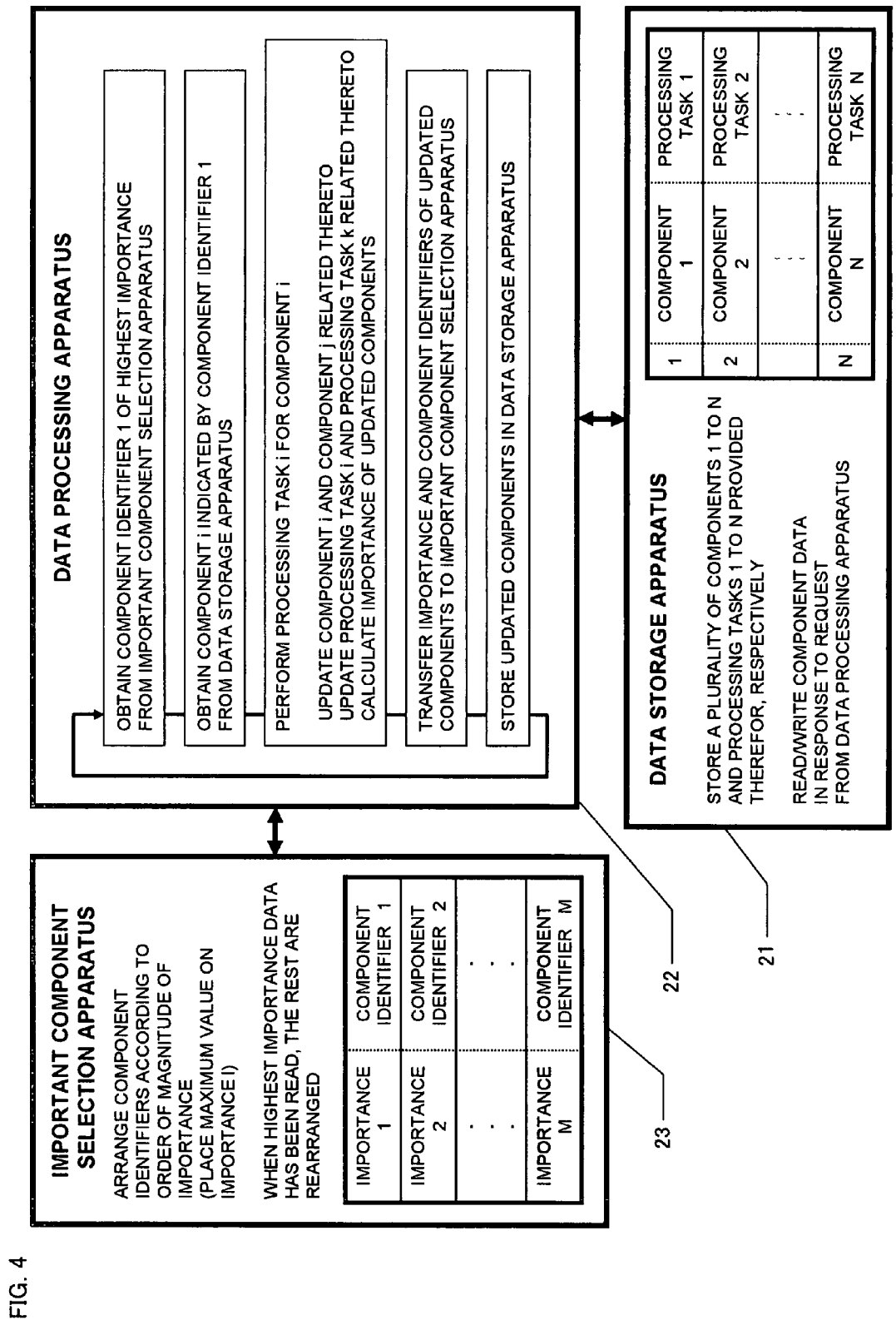
FIG. 4 is an illustrative diagram showing a summary of an operation in the second embodiment.

A second embodiment is shown in FIG. 3 and a summary of a main operation in the second embodiment is shown in FIG. 4. The second embodiment is different from the first embodiment in that a data storage apparatus 21 stores component data and processing tasks to be performed when the component data are selected and an data processing apparatus 22 uses such information to control data processing. By doing this, when there is a need to appropriately change a processing task according to the state of component data, data processing can be efficiently performed. Data to be stored as a processing task includes, for example, a list of identifiers of other component data that should be subjected to a calculation process at the same time or the name or identifier of a class to which that component belongs.

Figure 5:
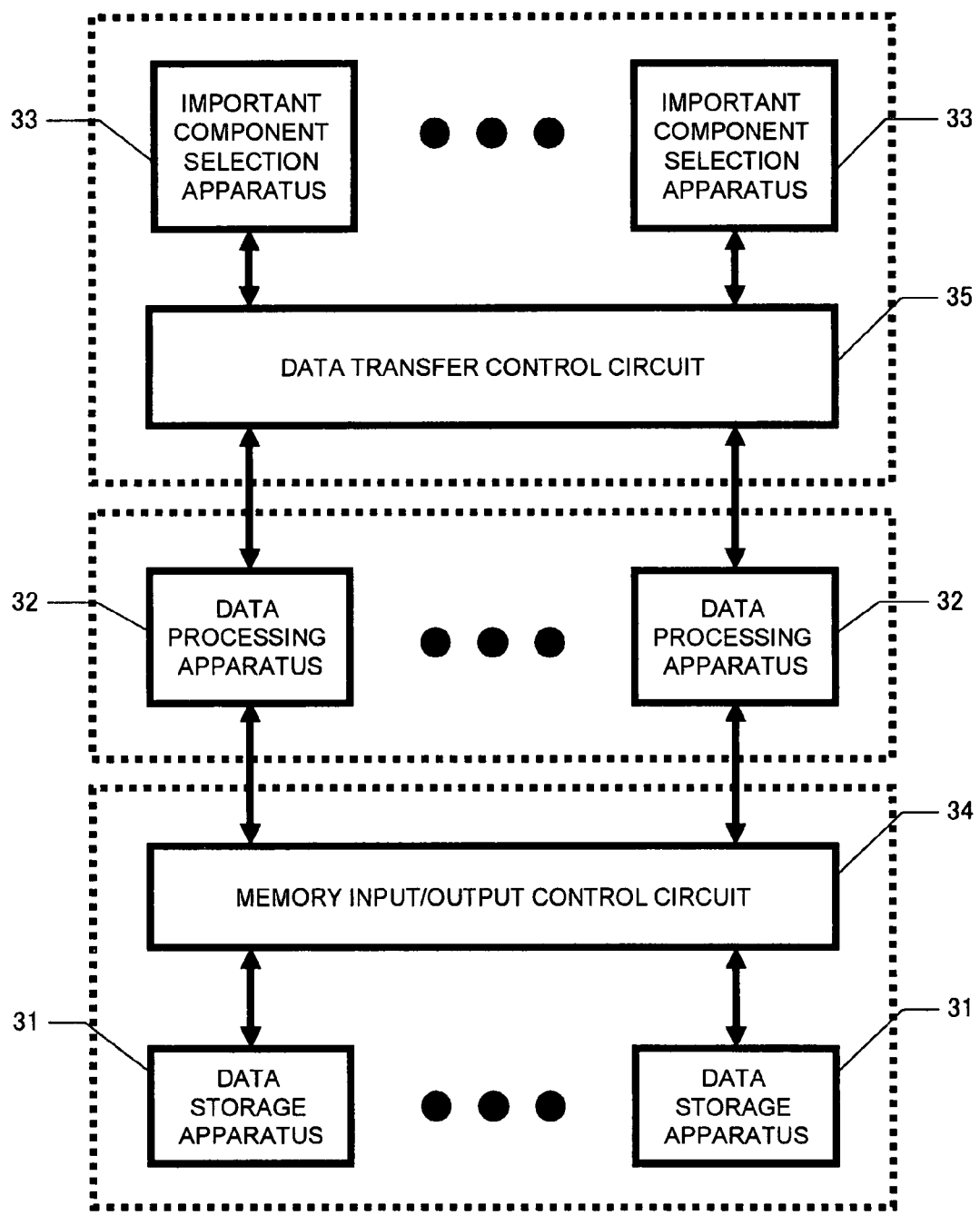
FIG. 5 is a basic block configuration diagram showing a third embodiment of the present invention.

A third embodiment is shown in FIG. 5. A plurality of important component selection apparatuses 33, a plurality of data processing apparatuses 32, and a plurality of data storage apparatuses 31 are arranged in parallel and the apparatuses perform their respective processes parallelly and simultaneously, whereby the speed of execution can be increased. Data transfer between the plurality of data processing apparatuses 32 and the plurality of important component selection apparatuses 33 is controlled by a data transfer control circuit 35. Data transfer between the plurality of data processing apparatuses 32 and the plurality of data storage apparatuses 31 is controlled by a memory input/output control circuit 34. It is also possible that a plurality of data processing apparatuses 32 may be provided and may access a single shared important component selection apparatus in a time division manner.

For a control method of the data transfer control circuit 35, various methods can be applied. For example, a switching matrix may be used in the data transfer control circuit 35 so that data transfer can be performed from an arbitrary data processing apparatus 32 to an arbitrary important component selection apparatus 33, and connection combinations can be appropriately changed. It is also possible that, only when data transfer is performed from the data processing apparatuses 32 to the important component selection apparatuses 33, connection combinations may be changed, and in data transfer from the important component apparatuses 33 to the data processing apparatuses 32, connection combinations may be always fixed to the same connection combinations. In contrast, connection combinations for data transfer from the data processing apparatuses 32 to the important component selection apparatuses 33 may be fixed and connection combinations for data transfer from the important component selection apparatuses 33 to the data processing apparatuses 32 may be changed. When there is a possibility that a large number of input data to a single important component selection apparatus 33 may be concentrated at a time, a FIFO buffer register is installed on each data processing apparatus side to prevent wasted waiting time from occurring in the data processing apparatuses 32.

Figure 6:
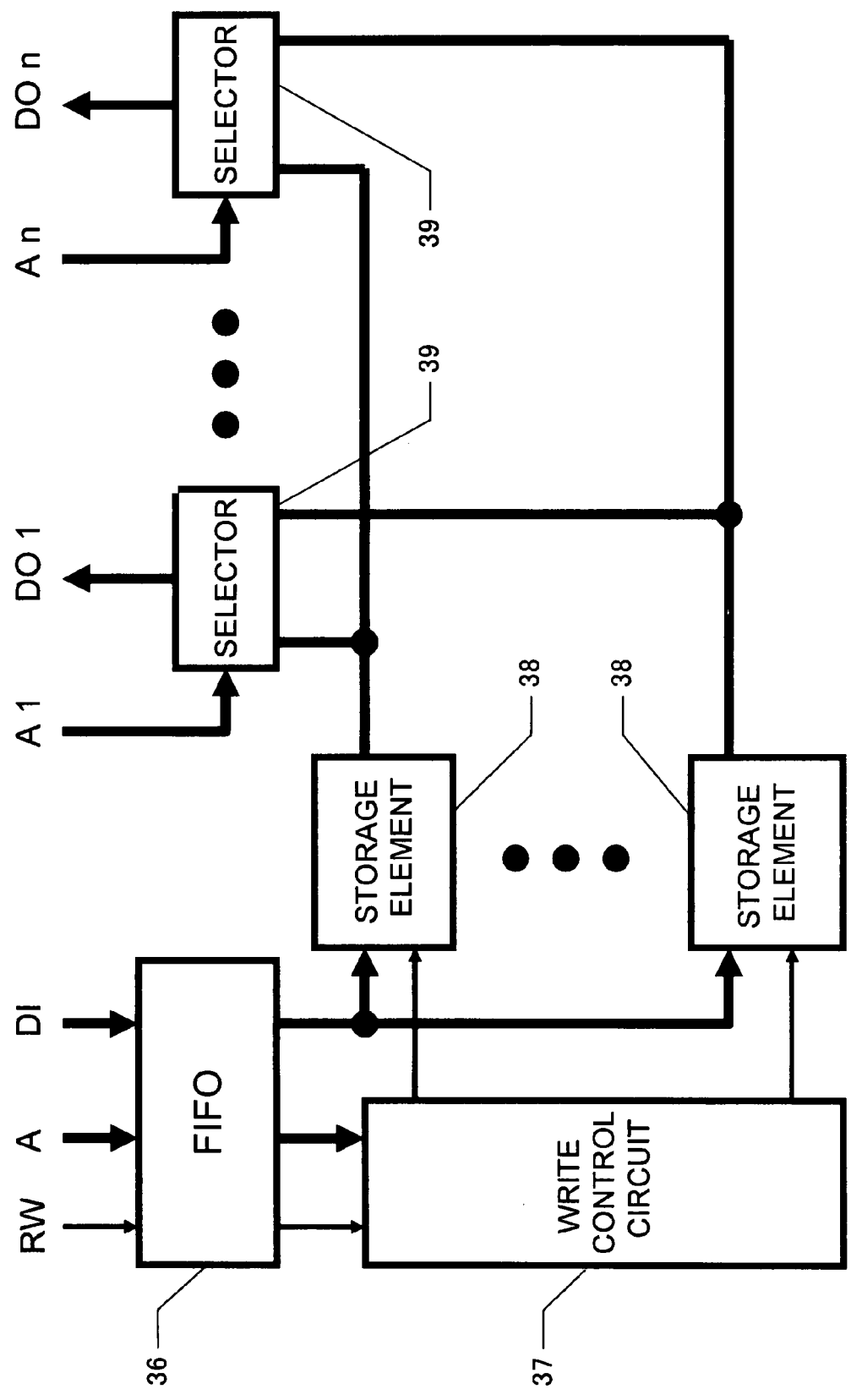
FIG. 6 is a block circuit diagram showing an example of a data storage apparatus for the third embodiment.

Control of the memory input/output control circuit 34 uses conventional techniques for input and output for distributed shared memory. Furthermore, in the case of increasing data read efficiency, a data output of a storage apparatus can be parallelized by using a multiport so that a plurality of different data can be outputted simultaneously. An embodiment of a data storage apparatus 34 for this is shown in FIG. 6. Data in a plurality of storage elements 38 can be read by a plurality of data selectors 39 parallelly and simultaneously. In this case, write data is temporarily stored in a FIFO buffer register 36 and thereafter a write control circuit 37 performs a write to the storage elements 38 in turn. When there is a possibility that a large number of write data from a plurality of data processing apparatuses may be concentrated at a time, a FIFO buffer register is further installed on each data processing apparatus side to prevent wasted waiting time from occurring in the data processing apparatuses.

Figure 7:
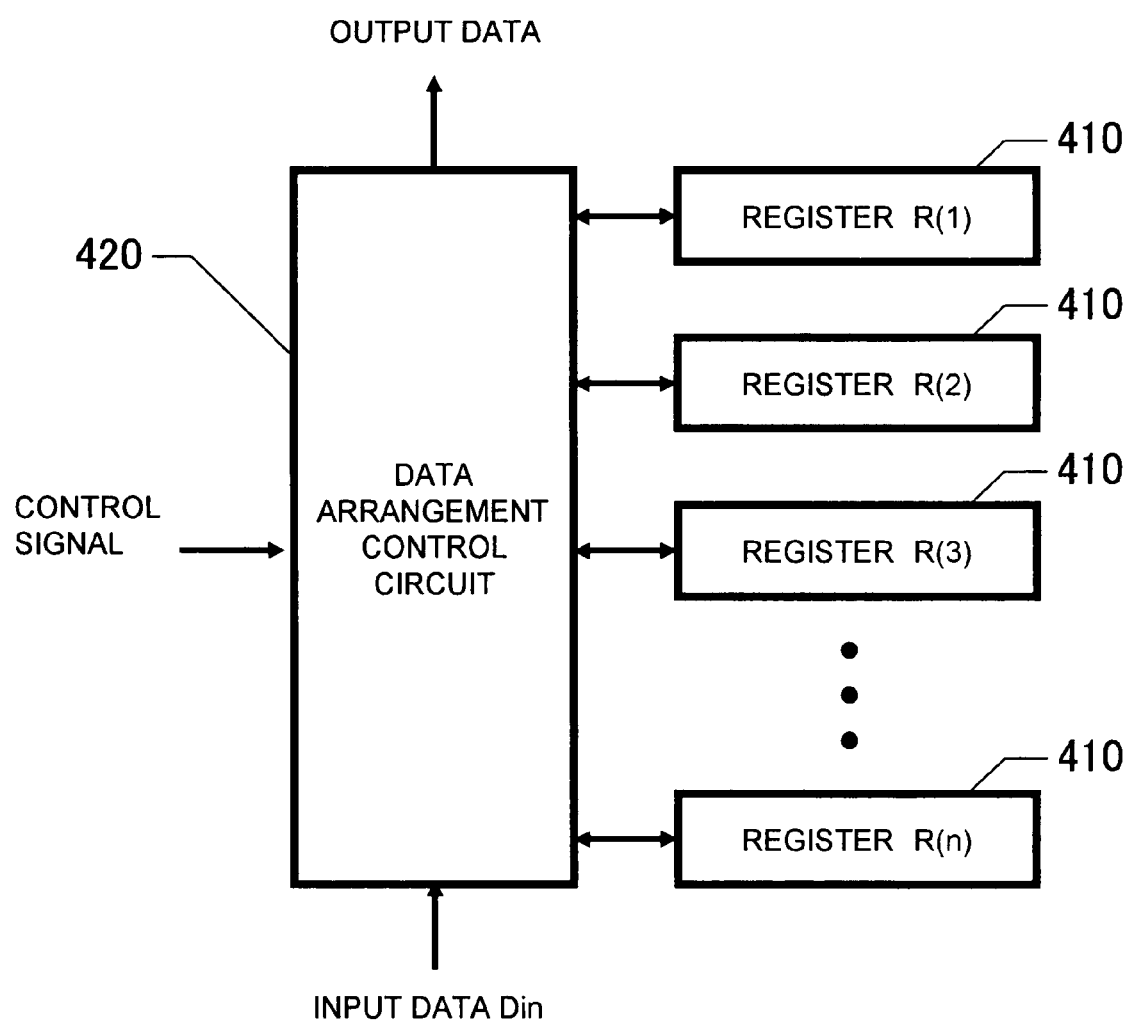
FIG. 7 is a basic block configuration diagram of hardware for an important component selection apparatus which is a fourth embodiment of the present invention.

A basic block configuration diagram of an important component selection apparatus in a fourth embodiment for the case in which the important component selection apparatus is implemented by hardware is shown in FIG. 7. The apparatus is comprised of a data arrangement control circuit 420 and n registers 410 that hold n data. The data arrangement control circuit 420 arranges the data according to the order of magnitude of importance and holds the data in the registers. Let $R(1), R(2) \ldots R(n)$ be n registers 410, where $R(1)$ holds the highest important data, $R(2)$ holds the second highest important data, and so forth. When there is input data, PUSH is inputted to the data arrangement control circuit 420 as a control signal. Let Din be the input data. When the importance Pin of the input data Din is higher than the importance $P(n)$ of $R(n)$, then the input data is inserted in an appropriate register and data in the respective registers are rearranged so as to keep the overall magnitude order relation. From an output, data in $R(1)$ can be read. In the case of reading, POP is inputted to the data arrangement control circuit 420 as a control signal. By this, each data moves up one position, i.e., data in $R(k+1)$ is shifted to $R(k)$. As for $R(n)$, it should be set equal to the lowest importance value, e.g., zero. Since a register with a smaller register number stores a higher priority data, a register with a smaller number is regarded as a "higher order" register and a register with a larger number is regarded as a "lower order" register.

Figure 8:
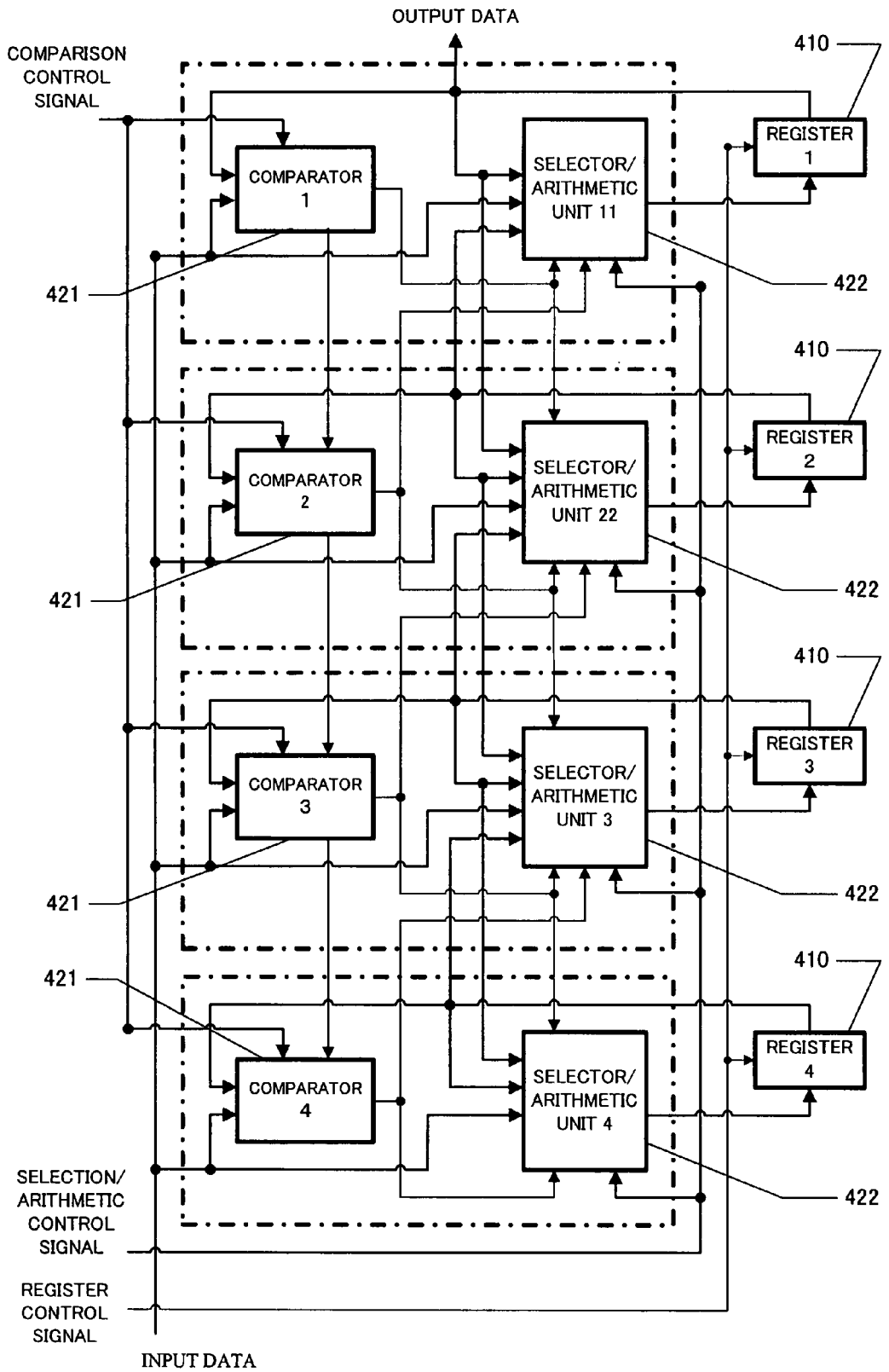
FIG. 8 is a block circuit diagram showing a specific example of a basic circuit configuration of the fourth embodiment.

To describe a detailed structure of the data arrangement control circuit 420, an example for the case in which n=4 is shown in FIG. 8. Comparators 421 and selectors/arithmetic units 422 are provided for the respective registers 410. Each circuit block is controlled by at least one of a register control signal, a comparison control signal, or a selection/arithmetic control signal. The register control signal controls capturing of data in a register. A comparator k provided for a register k compares input data Din with data $R(k)$ in the register k and outputs a result of the comparison. A selector/arithmetic unit k selects one from four data, including the input data Din and data $R(k-1)$, $R(k)$, and $R(k+1)$ in the registers, and then output the selected data to be stored in the register k. Which data is to be selected is controlled by comparison outputs from the comparators k, (k−1), and (k+1). In addition, the selector/arithmetic unit k outputs a value obtained by performing an arithmetic process, such as addition, subtraction, multiplication, or division, or a bit shift, on the data in $R(k)$.

Figure 9:
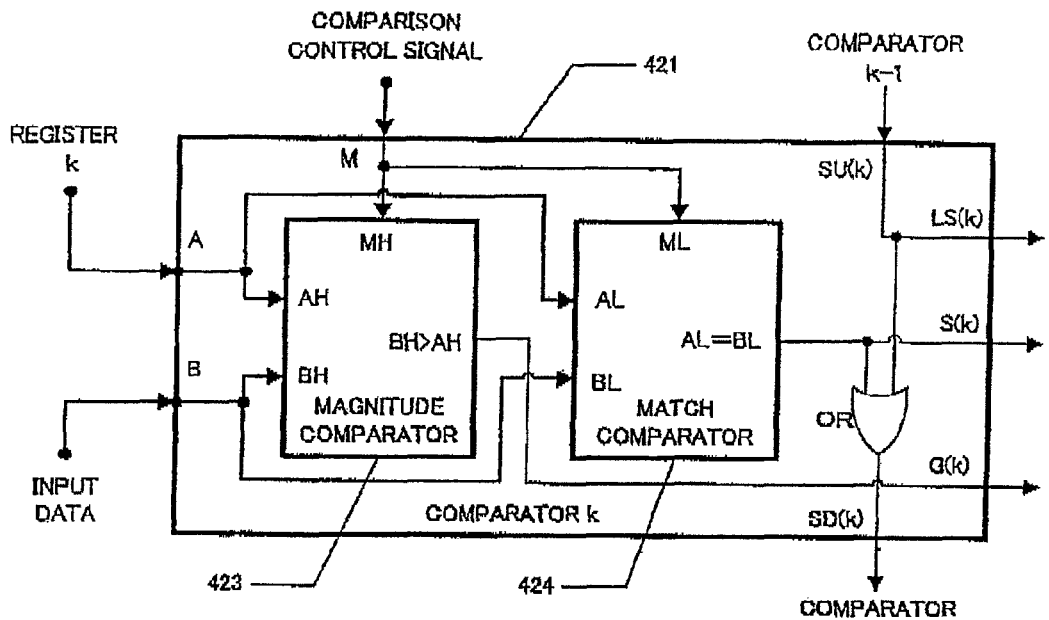
FIG. 9 is a block circuit diagram showing an example of a comparator of the fourth embodiment.

A more detailed configuration of the comparator 421 is shown in FIG. 9. Input data and data held in a register each include an importance and a component identifier. The comparison control signal includes mask data for setting each bit configuration, as information for extracting a portion of importance and a portion of a component identifier included in data, and controls data to be subjected to a magnitude comparison and a match comparison. A magnitude comparator 423 compares the importance Pin of input data Din with the importance $P(k)$ of data in a register k. If the importance of the input data is higher, i.e., $Pin>P(k)$, the magnitude comparator 423 outputs $G(k)=1$ and in other cases the magnitude comparator 423 outputs $G(k)=0$. The match comparator 424 compares a component identifier of the input data with the component identifier of the data in the register k. If the two match, the match comparator 424 outputs $S(k)=1$ and in other cases the match comparator 424 outputs $S(k)=0$. If any of higher order comparators outputs $S(k)=1$, $LS(k)=1$ is outputted and in other cases $LS(k)=0$ is outputted. Hence, a circuit that transmits an output of S(k)=1 to all lower order comparators is provided. That is, an output SD(k−1) of a comparator (k−1) is inputted to an input SU(k) of a comparator k and the signal is outputted as LS(k), and an OR of SU(k) and S(k) is outputted to SD(k) and SD(k) is connected to SU(k+1) of a lower order comparator (k+1).

Figure 10:
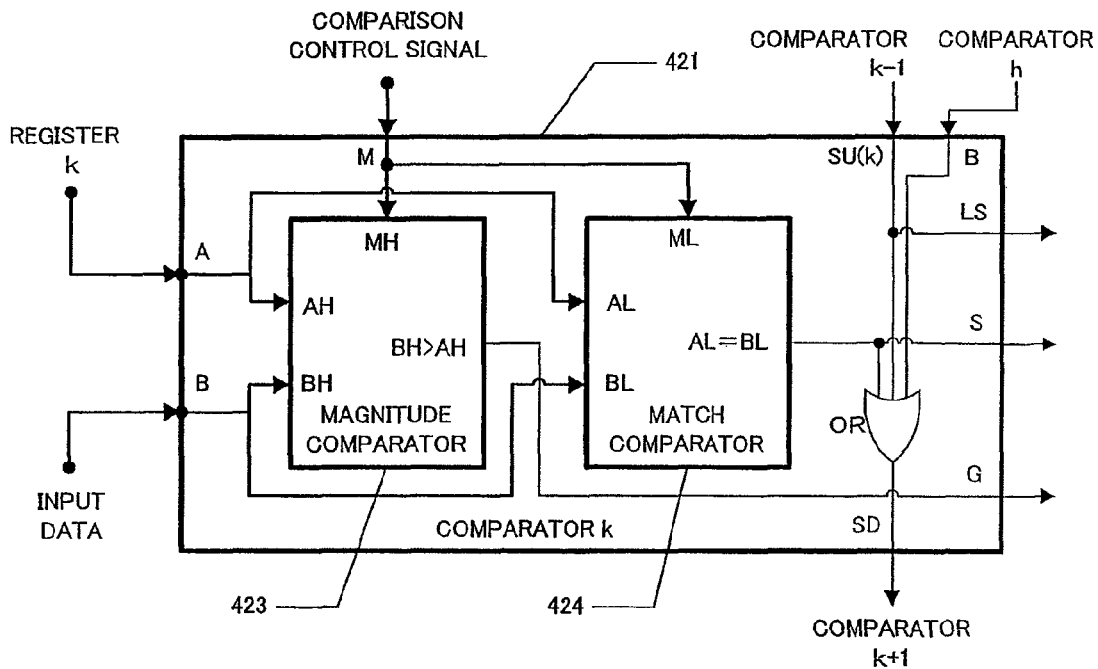
FIG. 10 is a block circuit diagram showing an example of a comparator for bypass wiring of the fourth embodiment.

When the number of registers is large, propagation of an LS(k) output to a lower order comparator takes a long time, which may cause a reduction in processing speed. Thus, to reduce propagation delay, a bypass is provided to a signal propagation circuit. An embodiment for the case in which a bypass circuit is used is shown in FIG. 10. An input terminal B(k) is connected to one of inputs of a 3-input OR gate. To the input terminal B(k) is connected an output SD(h) of a comparator h which is higher in order than the comparator (k−1). Four or more inputs may be provided to the OR so that the OR may be connected to a further higher order comparator.

Figure 11:
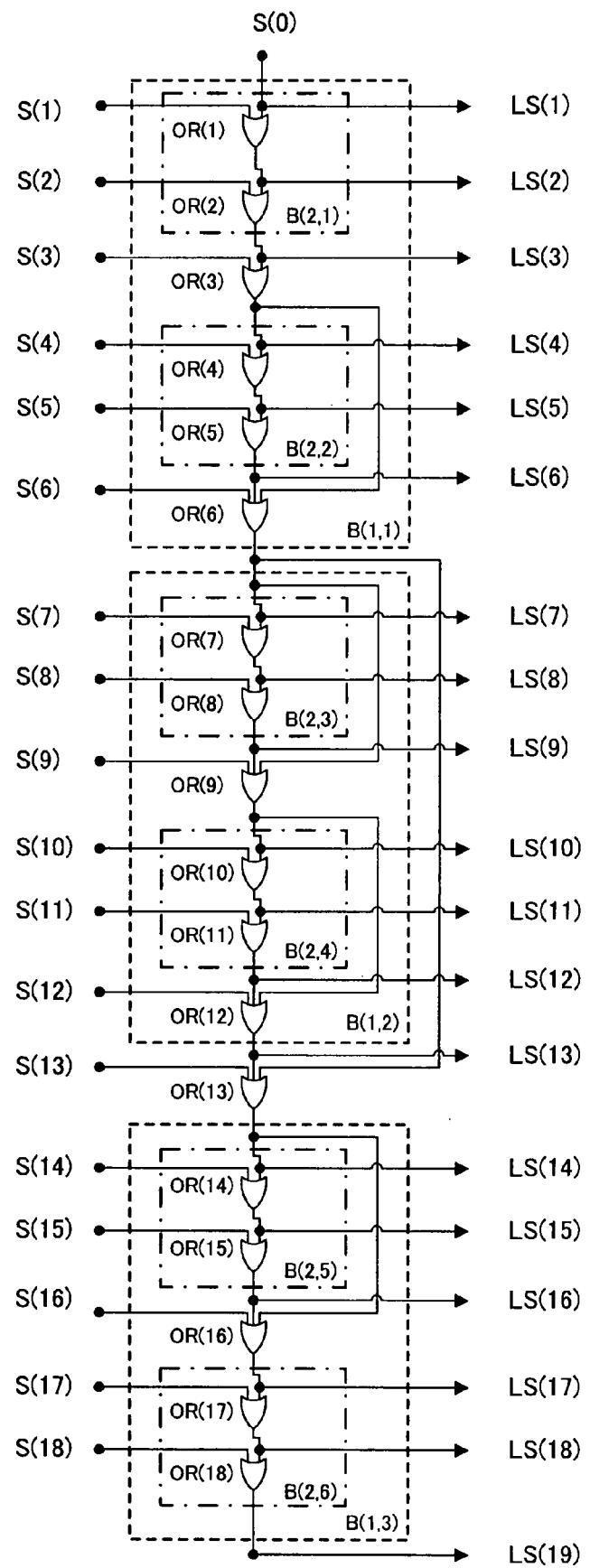
FIG. 11 is an illustrative diagram by a specific example of the bypass wiring of the fourth embodiment.

FIG. 11 shows an embodiment of bypass wiring that uses 3-input OR gates in the case in which the number of registers is 19. To generate outputs from LS(2) to LS(19), eighteen logic elements ORs from OR(1) to OR(18) are used. However, there is no input to a highest order comparator from a higher order comparator and thus an input S(0) of the OR(1) is always fixed to zero. Accordingly, the OR(1) may be omitted and S(1) may be directly connected to an OR(2) and LS(2). For bypass wiring, all ORs are divided into substantially equal three parts and an OR(13) located at about ⅔ from the top has three inputs, and one of the inputs is connected, as bypass wiring, to an output of an OR(6) located at about ⅓ from the top. By this, the number of effective logic gates in the longest propagation path from the input S to the output LS is reduced from 18 to 12. To further reduce the number of effective logic gates, ORs from (1) to (6) are classified as block B(1,1), ORs from OR(7) to OR(12) are classified as block B(1, 2), and ORs from OR(14) to OR(18) are classified as block B(1, 3) and bypass wiring is carried out in each block. Each block is divided into higher order and lower order sub blocks having substantially the same size, and a lowest order OR and a middle OR in the block each have three inputs and a wiring line that bypasses a sub block immediately above each sub block is provided. For example, in the case of the block B(1, 2), the block is divided into sub blocks B(2, 3) and B(2, 4), an OR(9) and an OR(12) each have three inputs, and an output of the OR(6) and an output of the OR(9) are connected to the OR(9) and the OR(12), respectively. However, providing a bypass wiring line gives almost no effect on a highest order sub block B(2, 1) and a lowest order sub block B(2, 6) and thus the bypass wiring line is omitted. As a result of adding bypass wiring of the sub blocks, the number of effective logic gates in the longest propagation path is improved to 8.

Figure 12:
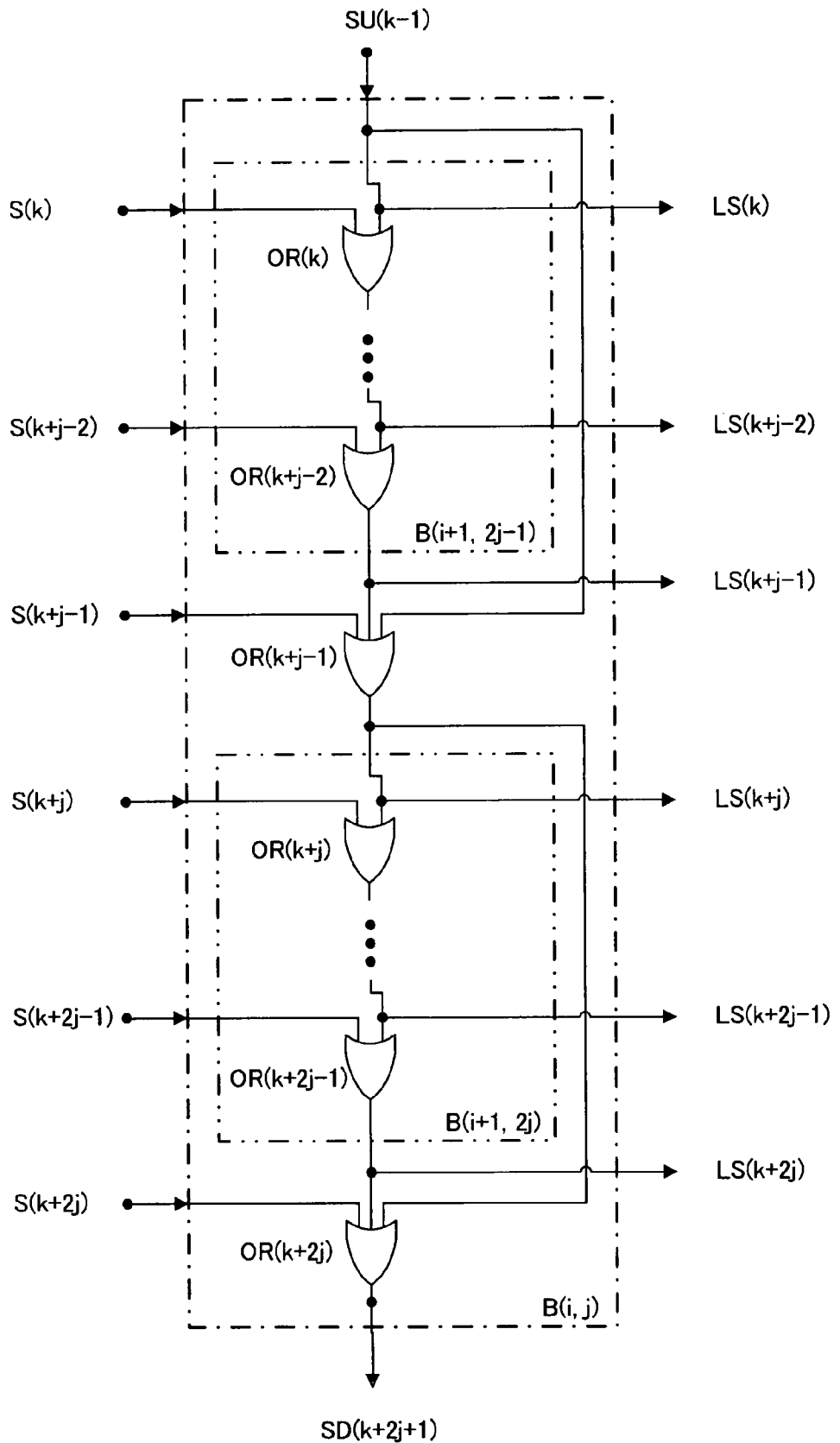
FIG. 12 is an illustrative diagram for an example of bypass wiring method of the fourth embodiment.

When the number of registers is further larger, as shown in FIG. 12, a sub block B(i, j) is further divided into substantially two equal parts, sub blocks B(i+1, 2j−1) and B(i+1, 2j), and a bypass line of each of the sub blocks is provided, whereby the number of effective logic gates in the longest path of the sub blocks is reduced almost by half. When this method is applied in a general way and if the number of effective logic gates in the longest path of a minimum sub-block is all Nb and the number of levels of sub-blocks (i.e., the number of levels of bypass lines) is Mh, a circuit can be configured in which the total number of bypass lines is $3(2^{Mh}-1)-2Mh$, the maximum number of effective logic gates in the longest propagation path is $2Nb+3Mh-2$, and the number of registers is $3Nb\cdot 2^{(Mh-1)}+3(2^{Mh}-1)-Mh$. In the case of FIG. 11, Nb=2, Mh=2, the total number of bypass lines is 5, the maximum number of effective logic gates in the longest propagation path is 8, and the number of registers is 19.

Figure 13:
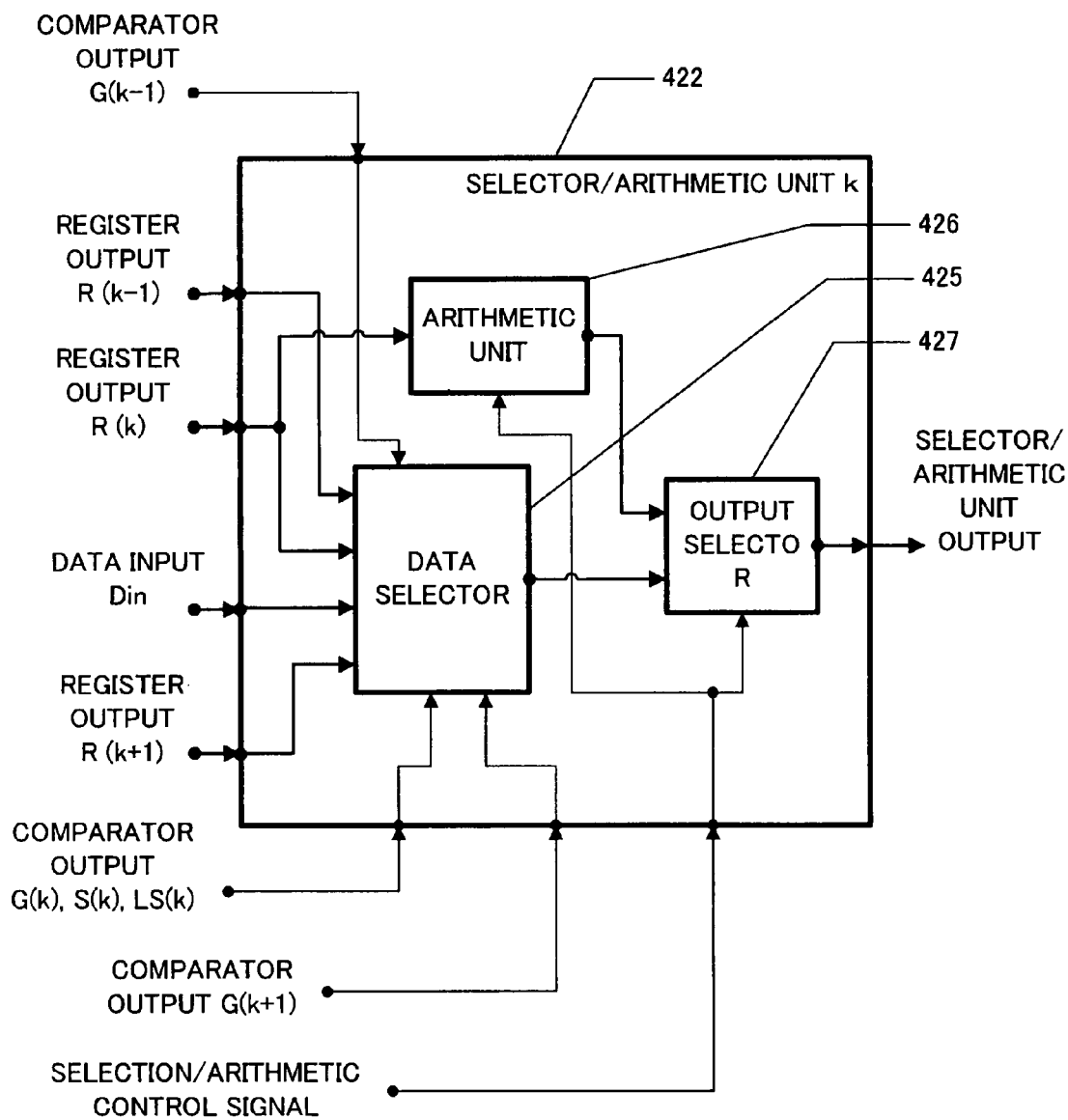
FIG. 13 is a block circuit diagram showing an example of a selector/arithmetic unit of the fourth embodiment.

A detailed structure of the selector/arithmetic unit k corresponding to the register k is shown in FIG. 13. The selector/arithmetic unit k is comprised of a data selector 425 that selects data to be inputted to the register k, an arithmetic unit 426 that performs an arithmetic process on data R(k) in the register k and outputs a result thereof, and an output selector 427 that selects one of an output from the data selector 425 and an output from the arithmetic unit 426. The data selector 425 selects one of four data, including input data Din and data R(k−1), R(k), and R(k+1) in registers, and outputs the selected data. A selection/arithmetic control signal controls selection of the output selector 427, includes an arithmetic parameter, such as an addend or a number of bit shifts, and thus also controls an arithmetic process. A control signal controls five types of operations, including PUSH for a data input process, POP for a data output process, ADD for an addition process, bit-shift SFTL in an MSB direction, and bit-shift SFTR in an LSB direction.

The relationship between a control signal of the selector/arithmetic unit k and a selector/arithmetic unit output is shown in FIG. 14 in a table format. An output depends on the importance of components and their positions in the registers of the important component selection apparatus. The dependence is represented by combinational logic functions of comparator outputs. The symbol * indicates unknown or don't care as a logic value. Ks indicates the index number of a register that stores the same component identifier as input data Din. That is, S(Ks)=1. When there is no data in the registers that has the same component identifier as input data, S(k)=0 for every k and LS(n)=0 and thus for convenience it may be regarded such that Ks=n+1.

In the case of PUSH, when a condition is such that a value Pin of the importance of input data Din is less than or equal to a value P(k) of the importance of data R(k) in the register k, i.e., P(k)≧Pin, R(k) does not need to be changed and thus a selector/arithmetic unit output is R(k). This condition is indicated only by a comparator output G(k)=0 and does not depend on other comparator outputs and thus G(k−1)=*, G(k+1)=*, S(k)=*, and LS(k)=*. Conditions such that P(k−1)≧Pin<P(k) and k≦Ks are conditions for an insertion location of Din. Specifically, they are indicated by G(k−1)=0, G(k)=1, G(k+1)=*, S(k)=*, and LS(k)=0 and a selector/arithmetic unit output to the k is Din. Conditions such that Pin>P(k−1) P(k) and k≦Ks indicate that R(k) has lower importance than Din and P(k)≦P(Ks), and thus, R(k) should be moved down one position by the insertion of Din. That is, under conditions that G(k−1)=1, G(k)=1, G(k+1)=*, S(k)=*, and LS(k)=0, R(k−1) which is one position above is assigned to R(k), and thus, the selector/arithmetic processing output is R(k−1). In the case in which k>Ks, even if Din is inserted, R(Ks) is deleted and thus it indicates a condition that the position does not change. In the case also in which Din is not inserted, the position does not change and thus this does not depend on a value of importance, and under conditions that G(k−1)=*, G(k)=*, G(k+1)=*, S(k)=*, and LS(k)=1, a selector/arithmetic unit output is R(k).

In the case of POP, in a condition that P(k)≧P(k+1)≧Pin, i.e., G(k−1)=*, G(k)=0, G(k+1)=0, S(k)=*, and LS(k)=*, R(k+1) is not influenced by input data and thus moves up one position after reading R(1) and R(k+1) moves to R(k). Specifically, R(k+1) which is one position below is assigned to R(k), and thus, the selector/arithmetic unit output is R(k+1). Conditions such that P(k)≧Pin>P(k+1) and k<Ks, i.e., G(k−1)=*, G(k)=0, G(k+1)=1, S(k)=0, and LS(k)=0, are conditions for insertion of Din and thus a selector/arithmetic unit output is Din. Conditions such that Pin>P(k) and k<Ks, i.e., G(k−1)=*, G(k)=1, G(k+1)=*, S(k)=0, and LS(k)=0 indicate that even if R(1) is read out, since Din is inserted, the position does not change, and the selector/arithmetic unit output is R(k). Finally, a condition such that k=Ks, i.e., S(k)=1, or k>Ks, i.e., LS(k)=1, does not depend on other conditions. In such a position k, even if Din is inserted in any higher order register, R(Ks) which is of higher order is deleted. Thus, regardless whether Din is inserted or not, lower order registers move up one position after reading R(1) and thus the selector/arithmetic unit output is R(k+1).

An arithmetic process is performed on importance P(k) included in R(k). ADD adds an arithmetic parameter "a" which is included in the selection/arithmetic control signal to P(k). SFTL performs a bit shift of a bit(s) in the MSB direction. SFTR performs a bit shift of a bit(s) in the LSB direction. By these processes changing a value of the importance P(k), it is possible to increase the probability that stored data is outputted or deleted and thus to prevent old data from remaining in a register for a long period of time.

The following describes the operation of the important component selection apparatus shown in FIG. 7. First, a fixed value is stored in all registers. When new data is inputted, the important component selection apparatus immediately compares importance data included in the input data with importance data included in stored data in each register. Stored data in a register whose value in an importance data portion is greater than or equal to that of the input data is left as it is, and all stored data in registers whose values in the respective importance data portions are smaller than that of the input data is shifted in a lower order direction. Then, the input data is inserted in an empty register between a register group whose stored data is greater than the input data and a register group whose stored data is smaller than the input data. However, when data having the same component identifier as the input data is stored in a register, if an importance held in the register is higher than the importance of the input data, the input data is not inserted. In contrast, if the importance is lower than the importance of the input data, the data in the register is deleted and the input data is inserted in an appropriate location. No two data stored in the registers have the same component identifier. By sequentially adding input data in such a manner, data is arranged and held in descending order of importance from a higher order to a lower order. Data having the highest importance is read from a higher order register and at that time all registers are shifted one position in the higher order direction to make preparations so that the second important data can be outputted. Since an insertion operation of input data and an output operation can be simultaneously processed in one machine cycle, an arrangement of data by importance can be performed at high speeds.

A specific example of the operation for such a case is shown in FIGS. 15, 16, and 17. Each of them follows the rules in FIG. 14. FIG. 15 shows the case of PUSH. Since input data Din (Pin=60) is inserted between P(3)=60 and P(4)=33, Din is assigned to R(4) and so R(4) and R(5) move to R(5) and R(6), respectively. A component identifier 555 of R(6) is the same as that of the input data and the importance is as low as Pin=15, and thus, R(6) is deleted. R(7) and R(8) do not change. FIG. 16 shows the case of POP when the same input data is present. After R(1) has been read, each R(2) and R(3) having an importance of 60 or higher move up one position. Importance P(4)=30 of R(4) is lower than that of the input data and thus Din is inserted in R(3) and the position of R(4) does not change. R(5) does not change, either. R(6) has the same component identifier as the input data and has lower importance and thus is deleted. Hence, lower order R(7) and R(8) move to R(6) and R(7), respectively. Data in the lowest order R(8) is cleared. This corresponds to the case that the importance is a minimum value of zero and the component identifier is NULL. FIG. 17 shows the case of POP. Since the importance of input data is Pin=7 and is lower than the importance P(6)=15 of R(6) that stores the same component identifier as the input data, the input data is not inserted and immediately after reading R(1), data in all registers moves up one position. Namely, R(k) moves to R(k−1) for k>1 and R(8) is cleared.

Figure 18:
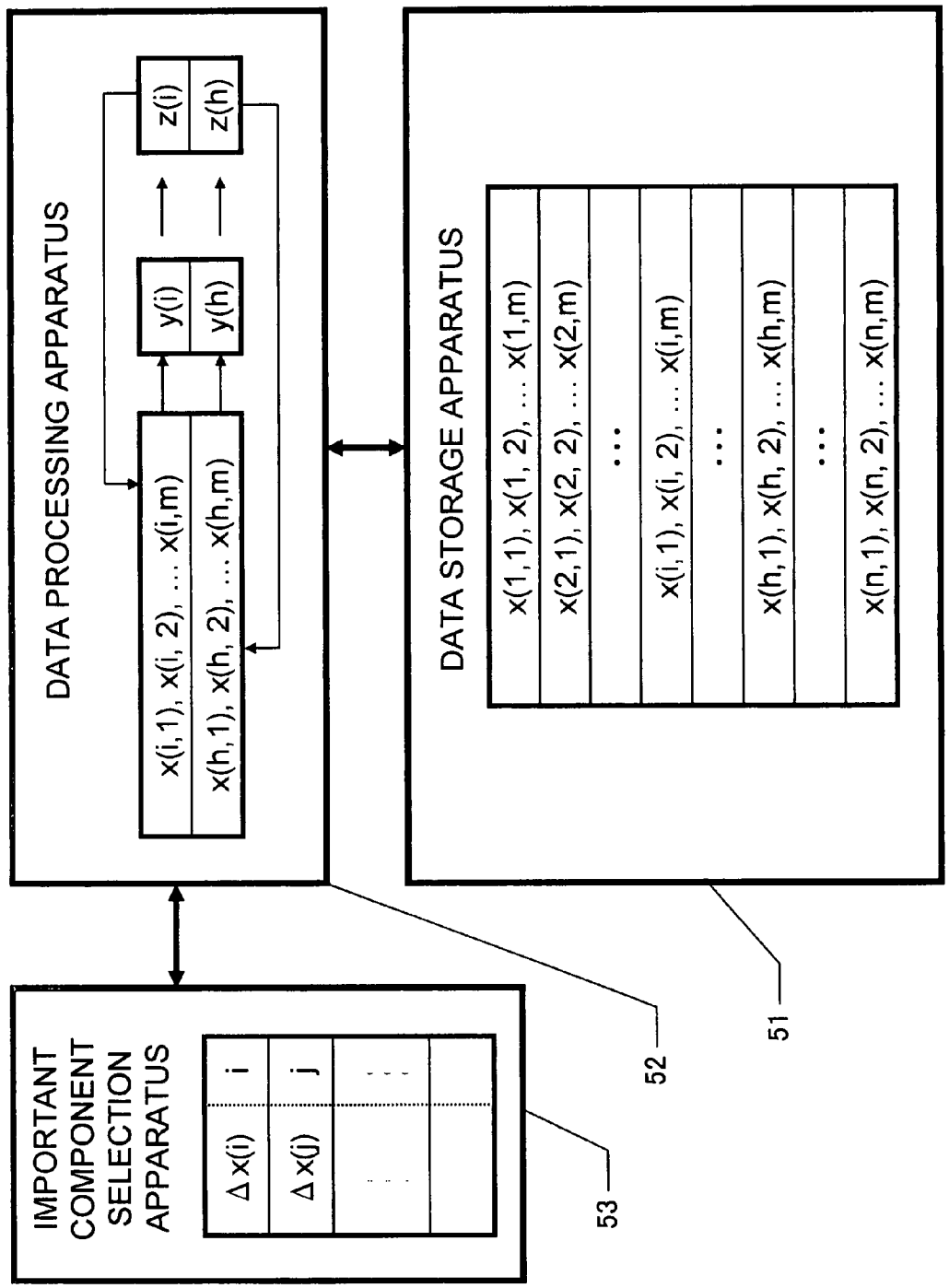
FIG. 18 is a diagram of a fifth embodiment of the present invention regarding storage of component data and a data processing method.

FIG. 18 is an illustrative diagram of a fifth embodiment of the present invention, and shows a representation scheme for component data for omitting wasted data processing of a component that leads to little change in the calculation results. In a data storage apparatus 51, a plurality of candidate value data are held for a single component. For example, m values of $x(i, 1), x(i, 2) \ldots x(i, m)$ are held as candidate values for an i-th component $y(i)$. A data processing apparatus 52 performs data processing using a representative value of the plurality of candidate values as a value of $y(i)$. For the representative value, as a statistic for $x(i, 1), x(i, 2) \ldots x(i, m)$, an average value or a median value, for example, is used. The data processing is controlled by a program. When, as a result of the data processing, $z(i)$ is obtained as an updated value of $y(i)$, a candidate value that is most distant from the updated value $z(i)$ among the candidate values is replaced with the updated value $z(i)$. Note that when the representative value $y(i)$ is re-calculated using an updated value and stored in the data storage apparatus 51, it can be used promptly in next calculation and thus calculation efficiency may improve.

For the importance of each component, the magnitude of variation among $x(i, 1), x(i, 2) \ldots x(i, m)$, denoted by $\Delta x(i)$, is regarded as the importance of a component i. For the magnitude of variation, for example, an absolute value of the difference between the maximum and minimum values of the candidate values $x(i, 1), x(i, 2) \ldots x(i, m)$, (i.e., $\max\{|x(i,u)-x(i,v)|\}$), a standard deviation, or the like is used. A component having large variation among candidate values for component data means that changes in updated value by data processing are large, and indicates conditions where values of the component data are not sufficiently converged in simulation or the like, or conditions where time variation is large. By regarding the magnitude of variation as an importance, data processing is conducted such that a calculation process of component data having a large change is given priority over component data having a little change. By this, a process of calculation with little change can be omitted, making it possible to obtain estimation results at faster speeds.

When a component i, in which $\Delta x(i)$ is largest, is outputted in an important component selection apparatus 53, the data processing apparatus 52 performs data processing for the component i according to the program, and if necessary, the data processing apparatus 52 also performs data processing on another component having a deep relevance to the component i by the program and updates this. When, for example, a component h as another component is also subjected to such data processing, the data processing apparatus 52 updates candidate values for the components i and h and sends the importance data of the components i and h to the important component selection apparatus 53. When the data processing apparatus ends one data processing loop, the data processing apparatus immediately reads an output of the most important component at that point from the important component selection apparatus 53 and then enters a next loop. Even if there is a delay in the processing time of the important component selection apparatus 53, the data processing apparatus is configured to be able to perform the process without waiting.

Figure 19:
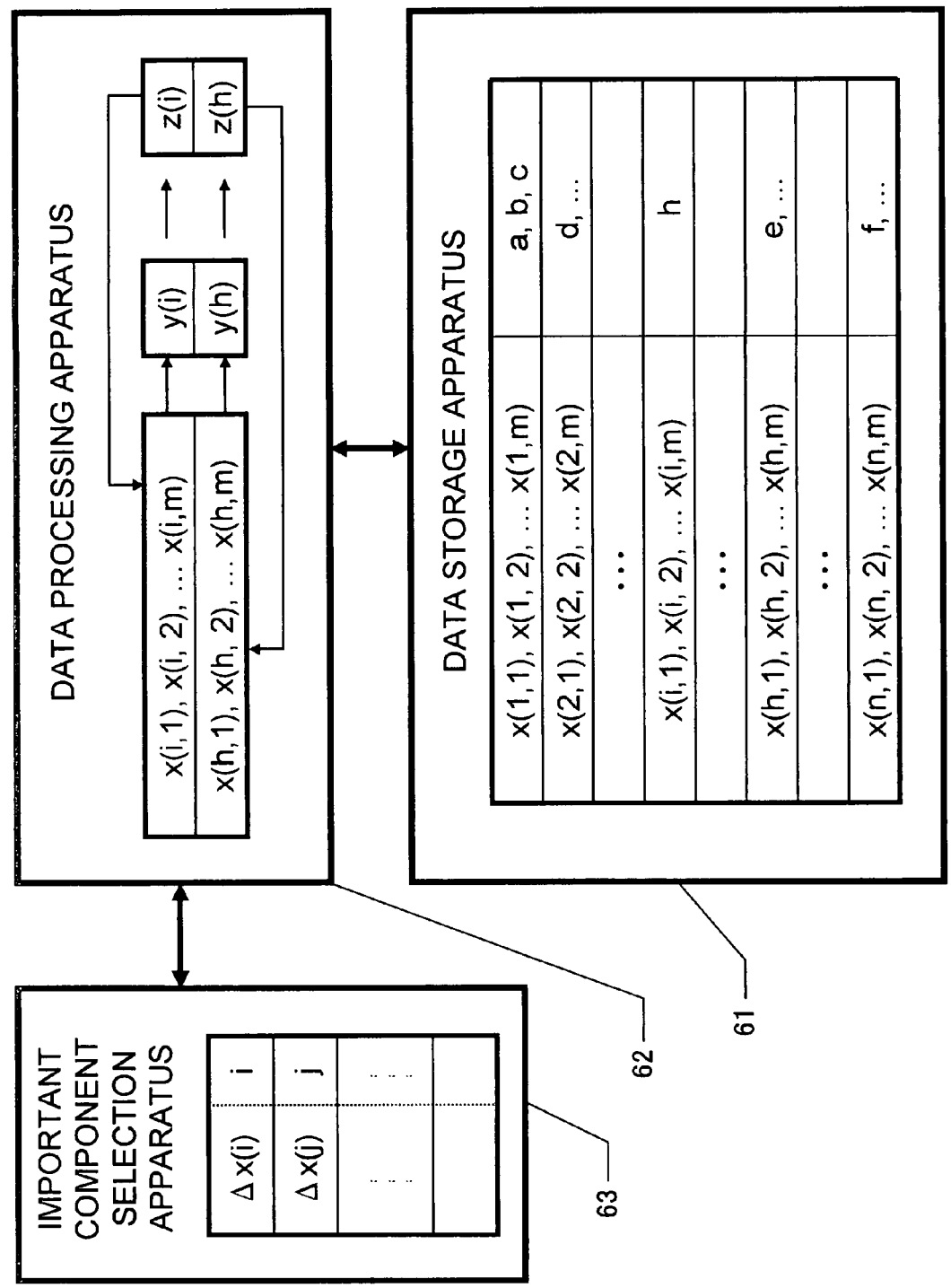
FIG. 19 is a diagram of a sixth embodiment of the present invention regarding storage of component data and a data processing method.

FIG. 19 is an illustrative diagram of a sixth embodiment of the present invention, and shows a representation scheme for component data. When a data processing task for a component i changes along with the change in a value of the component i, information on a processing task is held, as information attached to each component, in a data storage apparatus 61 for each component. In FIG. 19, the processing task is represented by "a", "b", "c", or the like. Specifically, for example, a processing task "h" of the component i represents a component identifier h which is another component identifier that needs to be referred to in data processing of the component i. In this process, a value of a component h may be updated. Alternatively, a processing task "d" of a component 2 may be the name of a class to which the component 2 belongs or an identifier name. This can be used when, for example, all components belonging to a class need to be subjected to data processing at the same time.

Figure 20:
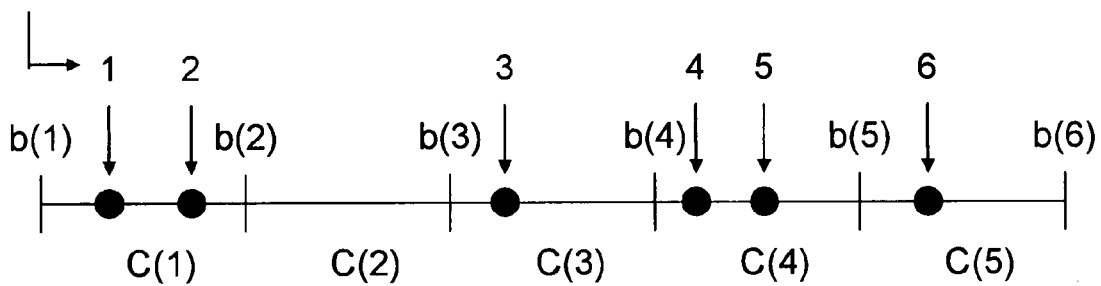
FIG. 20 is an illustrative diagram of a relationship between component data and a processing task in the sixth embodiment.

As an application example, the case of multiparticle dynamics simulation will be described below. The position coordinates of a given particle are represented as a component and a physical system in which interaction between particles acts only on particles within a certain distance is simulated. A space in which the particles move is divided into a plurality of regions and each region is assumed to be a class. For example, when the space is one dimensional, as shown in FIG. 20, the space is divided into five regions spaced at regular intervals of length L, and that particles located in the regions belong to classes $C(1)$, $C(2)$ ... $C(5)$, respectively. Let $b(j)$ and $b(j+1)$ be, respectively, the lower and upper boundary of $C(j)$, and let $Y(i)$ represent the position of particle i. If $b(j) \leq Y(i) < b(j+1)$, the class to which the particle i belongs is uniquely determined to be $C(j)$, and thus, information on particles belonging to the respective classes can be easily determined. It is also easy to change belonging particles of a class accordingly with updating their position coordinates. By storing this information, it can be readily seen what particle belongs to a given class. Hence, as a processing task of a component i, a belonging class $C(j)$ is stored. If the interaction takes place only within a distance L, calculation is performed taking into account only particles belonging to the adjacent classes, and there is no need to calculate with the other particles. Thus, when the component i is subjected to data processing as the most important component, calculation is required to be performed only on those components that belong to three classes $C(j-1)$, $C(j)$, and $C(j+1)$. This scheme can also be extended to the case of three dimensional space. In such a case, a three dimensional vector that represents three dimensional coordinates of a particle is regarded as a single component and data processing is performed accordingly.

INDUSTRIAL APPLICABILITY

For problems of data processing that uses the present invention, the following cases can be considered: a numerical solution for a problem of determining a sub-optimal solution in an optimization problem such as minimization of an energy function including multiple parameters; protein folding simulation in which a three dimensional structure is formed from a primary structure of a protein in a solvent under thermal fluctuations; and simulation of partial signal propagation on a large scale network with stochastic fluctuations. As described above, when performing simulation of a system in which, even if there are stochastic fluctuations, a state value does not rapidly diverge and tends to eventually settle in the vicinity of a convergence state, results can be obtained efficiently and at low cost.

The invention claimed is:

1. A data processing apparatus, comprising:
   a data storage unit that stores a plurality of data;
   a data processing unit that performs a processing for a data among the plurality of data and computes an importance value of the data for assigning a subsequent processing priority to the data; and
   an important component selection unit having a plurality of registers for storing a priority list, each register storing a set of an identifier indicating one of the data stored in the data storage unit and the importance value of the indicated data;
   wherein the important component selection unit outputs one of the identifiers whose corresponding importance value is the highest in the importance values stored in the registers;
   wherein the data processing unit performs: processing for the data indicated by the output of the important component selection unit, updating data stored in the data storage unit whose values are changed by the processing, computing the importance value of the each updated data, and transmitting the set of the importance value and corresponding identifier of the each updated data to the important component selection unit; and
   wherein the important component selection unit updates the priority list to reflect the transmitted set of the importance value and identifier, wherein, if the same identifier already exists in the priority list, the important component selection unit, comparing two importance values having the same identifier, excludes the lower one from the priority list.

2. The data processing apparatus of claim 1, wherein
   the important component selection unit comprises a data arrangement control circuit, and wherein
   the data arrangement control circuit makes the plurality of registers hold the plurality of data in accordance with each importance value of the plurality of data.

3. The data processing apparatus of claim 1, wherein a plurality of the data processing units are provided.

4. The data processing apparatus of claim 3, wherein a plurality of the data storage units and the important component selection units are provided.

5. The data processing apparatus of claim 4, further comprising:
   a first transfer control circuit that controls data transfer between the plurality of the data storage units and the plurality of the data processing units; and
   a second transfer control circuit that controls data transfer between the plurality of the important component selection units and the plurality of the data processing units.

6. A method of processing data using a data processing apparatus that has one or more control circuits, comprising the steps performed by the one or more control circuits of the data processing apparatus of:
   preparing a plurality of data, each data having a plurality of candidate values, an importance value and an identifier, and a priority list for setting a processing order for each data;
   performing a processing for one of data that has a highest priority in the priority list and is indicated by the corresponding identifier, wherein a statistic of the candidate values that refer mean or median for each data is used as a representative value of the data;

updating at least one of data whose value is changed into a new value by the processing, wherein the new value replaces one of the corresponding candidate values that is farthest from the new value;

computing the importance value of each updated data as a function of the corresponding candidate values that refer magnitude of variation;

determining the priority list in accordance with a magnitude of importance based on the computed importance value; and repeating the steps of performing, updating, computing and determining until termination condition is reached.

7. A recording medium recording a computer-readable program, wherein the computer-readable program when executed causes a computer to perform the steps of:

preparing a plurality of data, each data having a plurality of candidate values, an importance value and an identifier, and a priority list for setting a processing order for the plurality of data;

processing for one of data that has a highest priority in the priority list and is indicated by the corresponding identifier, wherein a statistic of the candidate values for each data is used as a representative value of the data;

updating at least one of data whose value is changed into a new value by the processing, wherein the new value replaces one of the corresponding candidate values that is farthest from the new value;

computing the importance value of each updated data as a function of the corresponding candidate values that refer magnitude of variation; and determining the priority list in accordance with a magnitude of importance based on the computed importance value; and the computer-readable program when executed causes the computer to perform another step of repeating the steps of processing, updating, computing and determining until termination condition is reached.

* * * * *